United States Patent
Strasser et al.

(10) Patent No.: US 6,400,865 B1
(45) Date of Patent: Jun. 4, 2002

(54) ARTICLE COMPRISING A BRAGG GRATING IN A FEW-MODED OPTICAL WAVEGUIDE

(75) Inventors: Thomas Andrew Strasser, Warren; Paul Stephen Westbrook, Chatham, both of NJ (US)

(73) Assignee: Fitel USA Corp., Norcross, GA (US)

( * ) Notice: Subject to any disclaimer, the term of this patent is extended or adjusted under 35 U.S.C. 154(b) by 90 days.

(21) Appl. No.: 09/584,072

(22) Filed: May 31, 2000

(51) Int. Cl.[7] .................................................. G02B 6/26
(52) U.S. Cl. .............................. 385/28; 385/37; 385/27; 385/123
(58) Field of Search ............................... 385/27, 28, 29, 385/37, 123, 127, 128

(56) References Cited

U.S. PATENT DOCUMENTS

| | | | |
|---|---|---|---|
| 5,717,798 A | 2/1998 | Strasser et al. | 385/37 |
| 5,740,292 A | 4/1998 | Strasser | 385/37 |
| 6,005,999 A | * 12/1999 | Singh et al. | 385/37 |
| 6,292,606 B1 | * 9/2001 | Riant et al. | 385/37 |
| 6,314,221 B1 | * 11/2001 | Riant et al. | 385/37 |

OTHER PUBLICATIONS

Shi, *IEEE Journal of Quantum Electronics*, "A Novel Fiber–Optic Fabry–Perot Resonator with Two Mode–Conversion Mirrors: Proposal and Application", vol. 32, No. 8, pp. 1360–1368, Aug. 1996.

Shi et al., *Optics Letters*, "Mode Conversion Based on the Periodic Coupling by a Reflective Fiber Grating", vol. 17, No. 23, pp. 1655–1657, Dec. 1, 1992.

Dutta et al., *Electronics Letters*, "Efficient, Nattowband $LP_{01} \leftrightarrow LP_{02}$ Mode Convertors Fabricated in Photosensitive Fibre: Spectral Response", vol. 27, No. 8, pp. 682–685, Apr. 11, 1991.

Holmes et al., *ECOC'99* "Novel Fibre Design for Narrow—Band Symmetric Response Sidetap Filters with Suppressed Leaky Mode Resonance", pp. 216–217, Sep. 26–30, 1999.

Erdogan et al., *J. Opt. Soc. Am. A*, "Tilted Fiber Phase Gratings", vol. 13, No. 2, pp. 296–313, Feb. 3, 1996.

* cited by examiner

Primary Examiner—Darren Schuberg
Assistant Examiner—Fayez Assaf
(74) Attorney, Agent, or Firm—Eugen E. Pacher

(57) ABSTRACT

Disclosed is an article that comprises an optical waveguide mode converter for converting light of wavelength $\lambda$ in a few-moded optical waveguide from a given guided mode (e.g., $LP_{01,f}$) to another guided mode (e.g., $LP_{02,b}$). The converter comprises a tilted refractive index grating in the core of the waveguide. Appropriate choice of the refractive index profile $n(r)$, photosensitivity $p(r)$ and tilt angle $\theta$ makes possible substantial nulling of the coupling between some guided modes (e.g., $LP_{01,f}$ to $LP_{01,b}$ and $LP_{01,f}$ to $LP_{11,b}$), and substantial maximization of the coupling between other guided modes (e.g., $LP_{01,f}$ to $LP_{02,b}$). Mode converters according to the invention can be advantageously used in optical fiber communication systems in add/drop multiplexers.

11 Claims, 5 Drawing Sheets

ARTICLE COMPRISING A BRAGG GRATING IN A FEW-MODED OPTICAL WAVEGUIDE

RELATED APPLICATIONS

This application is related to concurrently filed U.S. patent application Ser. No. 09/584,071 by T. A. Strasser et al., titled "Article Comprising a Tilted Grating in a Single Mode Waveguide", filed May 31, 2000, incorporated herein by reference.

FIELD OF THE INVENTION

This application pertains to few-moded optical waveguides with a refractive index (Bragg) grating, and to optical communication systems that comprise such waveguides.

BACKGROUND

Bragg gratings (also referred to as refractive index gratings) in optical waveguides are known. Conventionally such gratings couple a forward-propagating core-guided mode in single mode fiber to the backreflected core mode.

Mode conversion gratings are also known. See, for instance, U.S. Pat. Nos. 5,717,798 and 5,740,292. The latter discloses reflective gratings that inter alia couple light in the fundamental mode ($LP_{01}$) to the $LP_{11}$ mode.

Mode coupling gratings can find a variety of uses in optical waveguide systems. For instance, they can serve as wavelength routing filters in WDM networks.

However, it has been found that reflective grating mode converters that efficiently convert $LP_{01}$ radiation to $LP_{11}$ radiation frequently are difficult to manufacture, due to the spatial degeneracy of the $LP_{11}$ mode. Whereas one of the $LP_{11}$ spatial modes typically can be converted to $LP_{01}$ by a $LP_{01}$ to $LP_{11}$ mode converter, the other $LP_{11}$ spatial mode typically can not be so converted, due to the interference of two nearby degenerate spatial modes. This spatial degree of freedom is difficult to control. Thus, it would be desirable to have available a mode converter which does not involve coupling to or from a spatially degenerate mode.

In particular, there is a need for a mode converter which couples the $LP_{01}$ mode to the $LP_{02}$ mode, without coupling the $LP_{01}$ mode to any other guided mode, e.g., $LP_{11}$ and reflected $LP_{01}$. Such an $LP_{01}$–$LP_{02}$ mode converter could be used, for instance, in an add/drop multiplexer. This would avoid the need for an expensive and lossy circulator. Circulators are essential in implementing prior art Bragg grating-based add/drop filtering applications.

The $LP_{02}$ mode is not spatially degenerate and thus can be efficiently converted to $LP_{01}$. However, a $LP_{01}$ to $LP_{02}$ mode converting reflective grating typically must be designed such that both the $LP_{01}$ to $LP_{11}$ mode conversion and the $LP_{01}$ to $LP_{01}$ mode conversion are substantially nulled. The $LP_{11}$ mode must exist in the optical fiber since, in order for the $LP_{01}$ to $LP_{02}$ mode conversion to be strong, the optical fiber must guide the $LP_{02}$ mode, and therefore must also guide the $LP_{11}$ mode. To the best of our knowledge, the prior art does not provide a technique for making such a reflective $LP_{01}$ to $LP_{02}$ mode converter. This application inter alia discloses such a mode converter.

C. X. Shi, IEEE Journal of Quantum Electronics, Vol. 32(8), August, 1996, page 1360, provides a theoretical treatment of a fiber-optic Fabry-Perot resonator with two mode conversion ($LP_{01}$ to $LP_{02}$) "mirrors". See also C. X. Shi et al., Optics Letters, Vol. 17(23), page 1655, December 1992; and F. Bilodeau et al., Electronics Letters, Vol. 27(8), page 682, April 1991.

M. J. Holmes et al., ECOC '99, Sep. 26–30, 1999, Nice, France, pages I-216–217 disclose a fiber for sidetap filters. The fiber had a non-photosensitive core dopant for normalized radius less than 0.4, a combination of a non-photosensitive core dopant and germania for normalized radius 0.4–1, and a photosensitive cladding doped with germania out to a normalized radius of 3.5, to which boron was added to reduce the cladding index to match the deposition tube. The germania concentrations for the regions 0.4–1.0 and 1.0–3.5 were in the ratio 0.6:1.0 in order to obtain the required relative photosensitivity. The Holmes et al. paper thus discloses fiber in which the core had two different photosensitivity levels, with the cladding also being photosensitive. The photosensitivity profile was chosen to optimize the wavelength dependence of the cladding mode loss spectrum for applications, and not to obtain a mode converter of the herein relevant type.

All cited references are incorporated herein by reference.

GLOSSARY AND DEFINITIONS

For ease of exposition the discussion herein will generally refer to optical fibers. It will be appreciated, however, that similar results are obtainable in other optical waveguides, e.g., in planar waveguides.

The "coupling strength" between two guided core modes in a few-moded optical fiber is conventionally expressed in terms of an overlap integral, as shown in equation 2) below. The coupling strength typically depends on the refractive index profile $n(r)$, the photosensitivity profile $p(r)$, and the tilt angle $\theta$.

"Minimizing" the coupling between two guided core modes in a given waveguide means adjusting the tilt angle of a tilted grating such that the coupling strength between the two modes is less than −30 dB.

"Maximizing" the coupling between two guided core modes in a given waveguide means adjusting the tilt angle of a tilted grating such that the coupling strength between the two modes is at least about −10 dB.

By a "regular null" we mean herein a tilt angle region in a tilted ("blazed") fiber Bragg grating that has a core mode coupling strength for light of a predetermined wavelength that is less than −30 dB over only a small (typically less than 0.1°) angular range of the tilt angle. Regular nulls occur for many tilt angles.

By a "super null" we mean two (or possibly more) regular nulls that occur at closely spaced tilt angles, thereby making the core mode coupling at the predetermined wavelength very low (typically less than −30 dB) over a relatively large (more than 0.1°, desirably more than 0.2°, or even 0.5° or more) range of tilt angles between the regular nulls.

Modes of the guided light are designated $LP_{mn}$ in conventional fashion, with m and n being integers. Por instance, $LP_{01}$ is the fundamental mode. $LP_{01,f}$ refers to the forward propagating fundamental mode, and $LP_{01,b}$ refers to the backward propagating fundamental mode.

"Photosensitivity" refers to the refractive index change in the waveguide that results if an appropriately doped waveguide is exposed to actinic radiation, typically UV radiation.

A "few-moded" optical waveguide supports the fundamental mode and one or more higher order modes, typically no more than about 10 guided modes total.

The description of the invention herein is generally in terms of conversion between the fundamental mode and a higher order mode such as $LP_{02}$. This is for the sake of concreteness only, and the invention at least in principle can be embodied in an article for mode conversion between two appropriate higher order modes.

SUMMARY OF THE INVENTION

In an exemplary mode converter according to the invention, it is necessary that $LP_{01,f}$ light be strongly coupled into the $LP_{02,b}$ mode. However, in such a mode converter the coupling between $LP_{01,f}$ and all other guided reflected modes (exemplarily $LP_{11,b}$ and $LP_{01,b}$) has to be small, exemplarily at least 20 dB less than $LP_{01,f}$ to $LP_{02,b}$ coupling. This simultaneous "nulling" of the coupling between $LP_{01,f}$ and the other guided modes (i.e., other than the desired coupling) can not be achieved with optical fiber that has uniform photosensitivity throughout the core, necessitating use of a more complex fiber design, as is described below.

The coupling strengths between the various guided modes in an optical fiber depend on the refractive index profile of the fiber and the electric fields of the various modes. Both of these parameters generally are fixed at the time of grating formation, and thus can not be varied to achieve a desired coupling. The only grating parameter which can be changed to significantly alter the relative coupling strengths is the tilt of the grating with respect to the core axis. However, with uniform photosensitivity in the fiber core, the control over the various coupling strengths that is achievable by introduction of a tilt in the grating is limited. In particular, with a uniform radial photosensitivity profile, it is impossible to "null" simultaneously an even-even reflection (e.g., $LP_{01,f}$ to $LP_{01,b}$) and an even-odd reflection (eg., $LP_{01,f}$ to $LP_{11,b}$). Thus, we have determined that an additional degree of freedom has to be provided. This degree of freedom is the photosensitivity profile of the optical fiber. This profile has at least two distinct levels of photosensitivity in the core (of which one or more can be zero), and may, but need not, have substantially no photosensitivity in the cladding.

Thus, by way of example, forming a Bragg grating in an optical fiber wherein photosensitivity is removed (or substantially reduced) in certain regions of the fiber core makes it possible to achieve a much broader range of relative coupling strength as a function of the tilt angle of the fiber than is possible with fiber having uniform photosensitivity in the core. In particular, it is possible to simultaneously null both an even-even (e.g., $LP_{01,f}$ to $LP_{01,b}$) and an even-odd (e.g., $LP_{01,f}$ to $LP_{11,b}$) reflection, with strong $LP_{01,f}$ to $LP_{02,b}$ coupling, something that is not possible with a tilted refractive index grating that has uniform photosensitivity in the core.

More generally, the invention is embodied in an article that comprises an optical waveguide mode converter for converting light of wavelength $\lambda$ (exemplarily about 1.5 $\mu$m) from a forward-propagating given guided mode to another predetermined guided mode. The mode converter comprises a tilted refractive index grating in the waveguide, the grating having a tilt angle $\theta$ with respect to the waveguide axis and extending longitudinally over at least a portion of the waveguide. The waveguide is a few-moded waveguide for light of wavelength $\lambda$ and has a core and a cladding that contactingly surrounds the core. The fiber has a dopant distribution selected to provide the fiber with a refractive index profile n(r) and a photosensitivity profile p(r), with both profiles being functions of the radial coordinate r of the waveguide.

The mode converter has two or more non-zero coupling strengths among core guided modes, and p(r) has at least two different levels of photosensitivity in the core. Furthermore, n(r), p(r) and $\theta$ are selected such that more than one of said non-zero coupling strengths are simultaneously nulled. For instance, n(r), p(r) and $\theta$ are selected such that a given guided mode (e.g., $LP_{01,f}$) is nulled with at least one other guided mode (e.g., $LP_{01,b}$ and $LP_{11,b}$), and is strongly coupled to at least one other guided mode (e.g., $LP_{02,b}$). In a preferred embodiment of the invention, the fundamental mode $LP_{01,f}$ is nulled simultaneously with an even and an odd backward-propagating guided mode ($LP_{01,b}$ and $LP_{11,b}$, respectively), and $LP_{01,f}$ is simultaneously strongly coupled to a higher order even mode (e.g., $LP_{02,b}$).

DETAILED DESCRIPTION

Figure 1A:
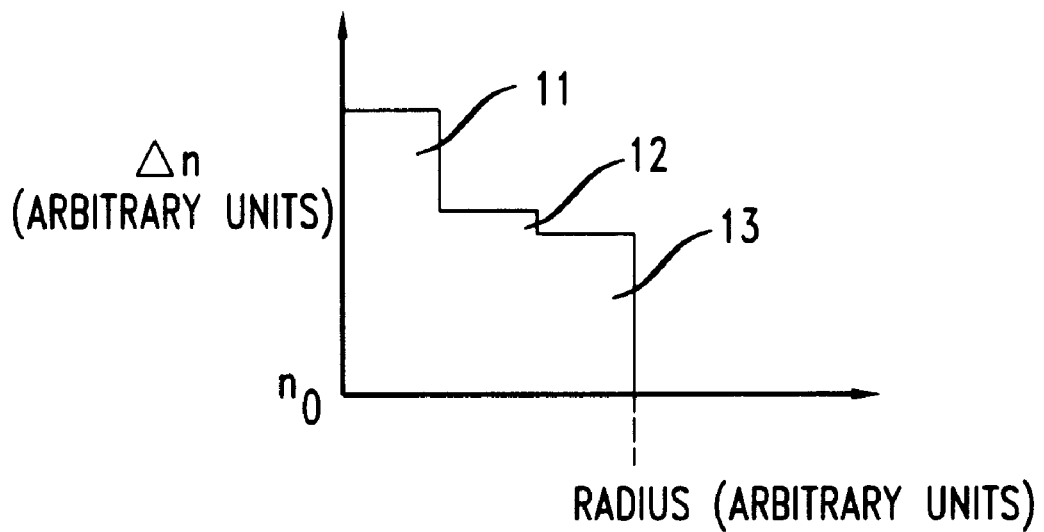
FIGS. 1a and 1b schematically show a refractive index profile and a photosensitivity profile for an exemplary fiber according to the invention.

Below we provide mathematical expressions that can be used to determine a photosensitivity profile that at least approximately provides the desired coupling strengths. If desired, optimized results can then be obtained by, typically minor, variation of the tilt angle, or possibly of the photosensitivity profile. Trimming of the photosensitivity profile by UV exposure can also be used for optimization.

The coupling between a first and a second guided mode (designated $LP_{mn}$ and $LP_{pq}$) in an optical waveguide depends on the coupling strength $\kappa$, which is proportional to the following $\theta$-dependent integral $$\kappa_{mn\text{-}pq}(\theta) = \int E_{mn} E_{pq} H(r) r \, dr, \qquad 1)$$

where H(r) depends on the mode indices and on the grating tilt angle (see, for instance, T. Erdogan et al., "Tilted Fiber Phase Gratings", J. Optical Soc. America, A. Vol. 13(2), pages 296–313, 1996), incorporated herein by reference.

For instance, if an optical fiber supports the $LP_{01}$ mode as well as the $LP_{11}$ mode then a tilted grating will couple the $LP_{01}$ mode to the $LP_{11}$ mode with a strength that depends on the $LP_{01}$ to $LP_{11}$ overlap integral. That is to say:

$$\kappa_{01\text{-}11}(\theta) = \int E_{01} E_{11} J_1 (K_{grating} r \sin\theta) W(r) r \, dr, \qquad 2)$$

where $E_{01}$ and $E_{11}$ are the radially dependent electric field amplitude (normalized to unity, i.e., $\int_0^\infty E^2_{01} r \, dr = 1$) of the $LP_{01}$ and $LP_{11}$ modes, $K_{grating}$ is the wave vector of the grating ($K_{grating} = 2\pi/\Lambda_{grating}$) $\theta$ is the tilt angle of the grating with respect to the fiber axis, and W(r) is a radially dependent weighting function which expresses the radial variations of p(r), the photosensitivity profile of the grating. The Bessel function $J_1$ arises from the azimuthal integration and is zero when $\theta = 0$, since the $LP_{11}$ mode is odd and the $LP_{01}$ mode is even.

The weighting function W(r) can be defined via the full index modulation of the tilted grating, namely $$\delta n(r, \Phi, z) = \delta n\, W(r)\, \exp[(iK_{grating})(\sin\theta\, r\cos\Phi + \cos\theta z)]. \quad (3)$$

In equation 3, $\Phi$ is the azimuthal angle in cylindrical coordinates and $\delta n$ is the amplitude of the index modulation. In a uniformly photosensitive fiber, W(r) is the same as the index profile n(r) and is unity up to the core radius. However, herein we consider fibers in which W(r) is not uniform and may or may not have the same radial dependence as the index profile n(r).

The above expressions can be used to determine the tilt angle $\theta$ that yields the desired coupling between two given guided modes, for a selected photosensitivity profile. If the mathematically determined value of $\theta$ does not directly yield the desired coupling strength then a minor amount of routine experimentation will typically suffice to determine a corrected tilt angle that yields the desired coupling, e.g., that nulls the coupling between the modes. After determination of the tilt angle that provides the desired coupling strengths, a grating having the tilt angle and a desired length and strength is manufactured in conventional manner.

In order to achieve efficient mode conversion between two predetermined guided modes in a few-moded optical fiber it is typically necessary to substantially null all couplings except the mode conversion coupling, and substantially maximize the mode conversion coupling. By way of example, if the fiber supports $LP_{01}$, $LP_{11}$ and $LP_{02}$, and does not support any other higher order modes (e.g., $LP_{21}$), and if the desired mode conversion is the $LP_{01,f}$ to $LP_{02,b}$ mode conversion, then the $LP_{01,f}$ to $LP_{01,b}$ coupling strength and the $LP_{01,f}$ to $LP_{11,b}$ coupling strength desirably are nulled, and the $LP_{01,b}$ to $LP_{02,b}$ coupling strength desirably is maximized.

For the sake of clarity the description below is for a $LP_{01}$ to $LP_{02}$ mode converter in a three-moded optical fiber. The approach can be extended to gratings in higher-moded optical fibers, and to coupling between any two spatial modes.

If a fiber supports an $LP_{01}$ and $LP_{11}$ mode then a tilted grating in the fiber will couple the $LP_{01,f}$ mode to the $LP_{11,b}$ mode with a strength that depends on the $LP_{01}$–$LP_{11}$ overlap integral. See equation 2 above. Analogous statements can be made about $LP_{01,f}$ to $LP_{01,b}$ coupling and $LP_{01,f}$ to $LP_{02,b}$ coupling. By appropriate choice of the photosensitivity profile p(r) of the fiber it is possible to simultaneously null the $LP_{01,f}$ to $LP_{01,b}$ coupling and the $LP_{01,f}$ to $LP_{11,b}$ coupling, and to obtain large $LP_{01,f}$ to $LP_{02,b}$ coupling.

In order to null both the $LP_{01}$ to $LP_{11}$ and the $LP_{01}$ to $LP_{01}$ couplings at the same value of tilt angle $\theta$, the photosensitivity profile p(r) must be appropriately selected. Simultaneous nulling is achieved when the photosensitivity is removed (or substantially lowered) over a radial range such that in the two coupling strength integrals the integrands are both positive in one of the regions and both negative in the other region, and both cancel each other in the total integral. Alternately, the simultaneous $LP_{01}$ to $LP_{01}$ and $LP_{01}$ to $LP_{11}$ nulling can be understood as the result of formation of a "supernull" for the $LP_{01}$–$LP_{01}$ coupling in which two regular nulls come close together for some value of tilt angle. This large angular range can then be made to overlap the $LP_{01}$–$LP_{11}$ angular null.

Figure 1B:
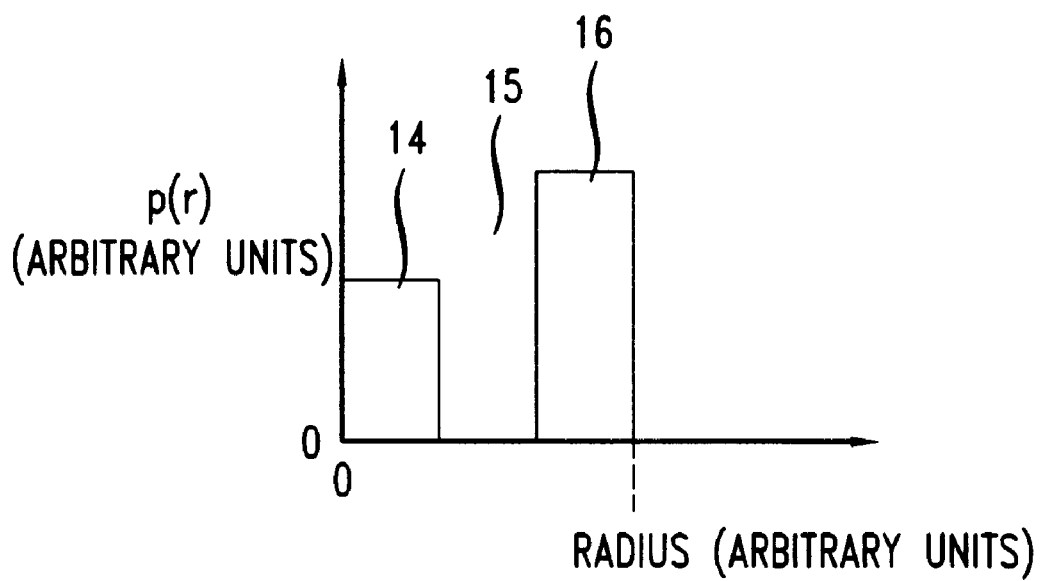

FIG. 1a schematically shows the refractive index profile of an exemplary three-moded fiber according to the invention, and FIG. 1b schematically shows the photosensitivity profile of the fiber. In FIG. 1a, no refers to the refractive index of silica. The innermost core region 11 is doped with Ge and Al, making the region partly photosensitive. The intermediate core region 12 is doped with Al, making it non-photosensitive, and the outermost core region 13 is doped with Ge, making it strongly photosensitive. See FIG. 1b, wherein the three core regions are designated 14–16, respectively.

Figure 2A:
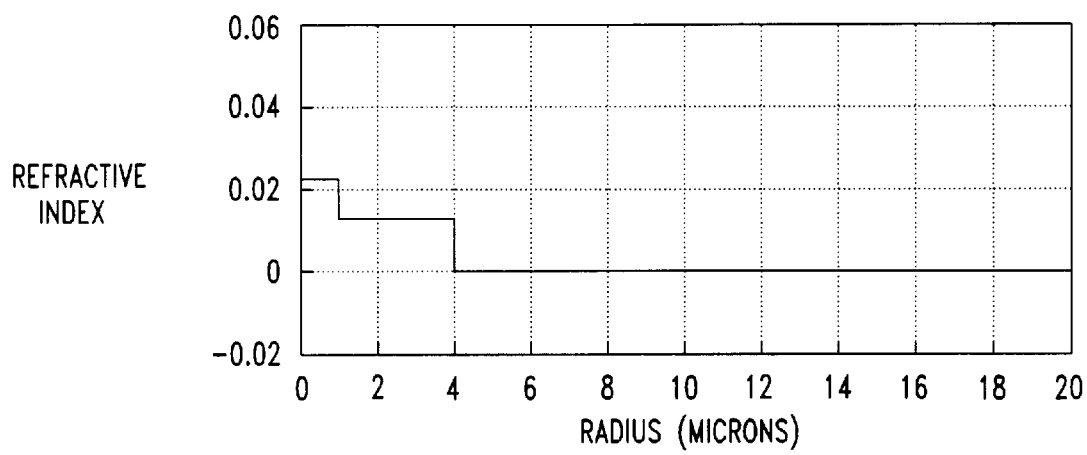
FIGS. 2a–2c schematically show the index profile, photosensitivity profile and mode electric fields of a fiber according to the invention.
Figure 2B:
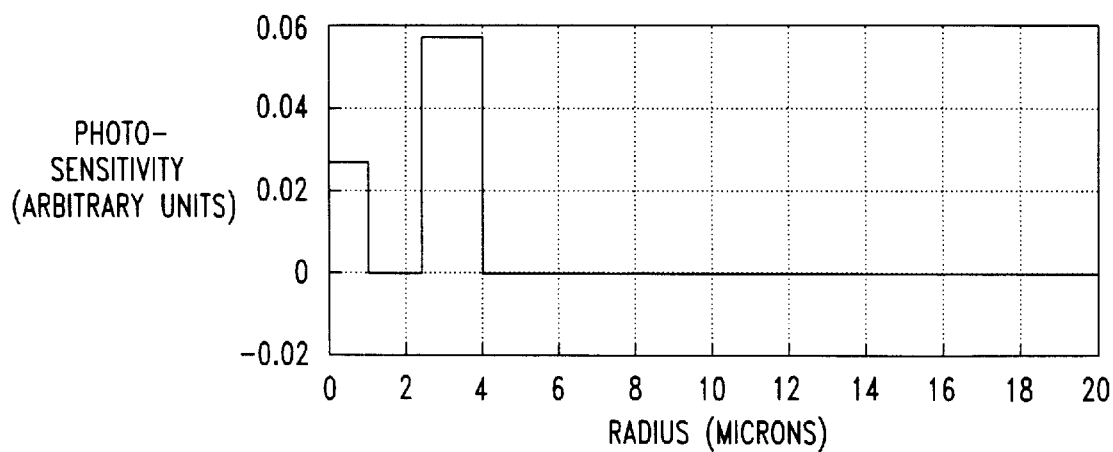
Figure 2C:
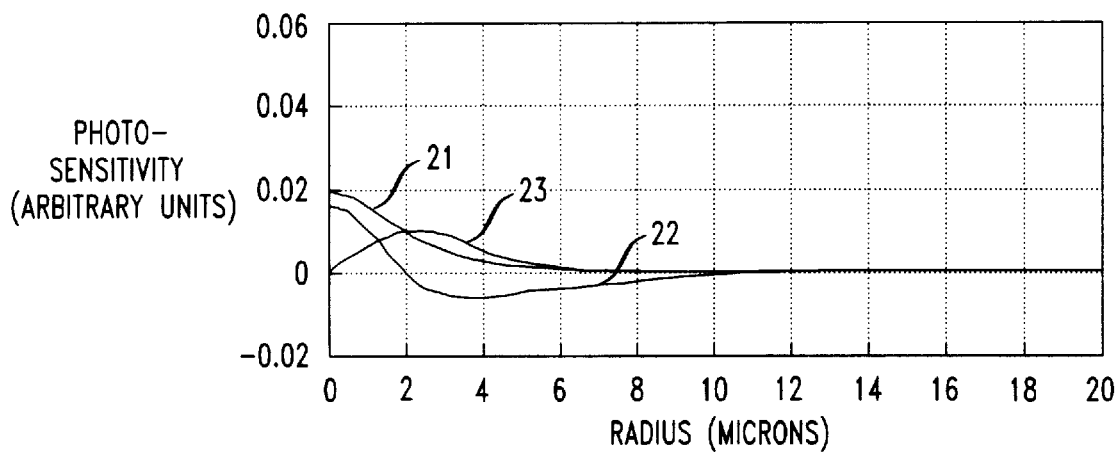

FIGS. 2a–b schematically show the refractive index profile and photosensitivity profile, and FIG. 2c shows the electric field strengths of $LP_{01}$ (ref. numeral 21), $LP_{02}$ (ref. numeral 22) and $LP_{11}$ (ref. numeral 23), respectively.

Figure 3:
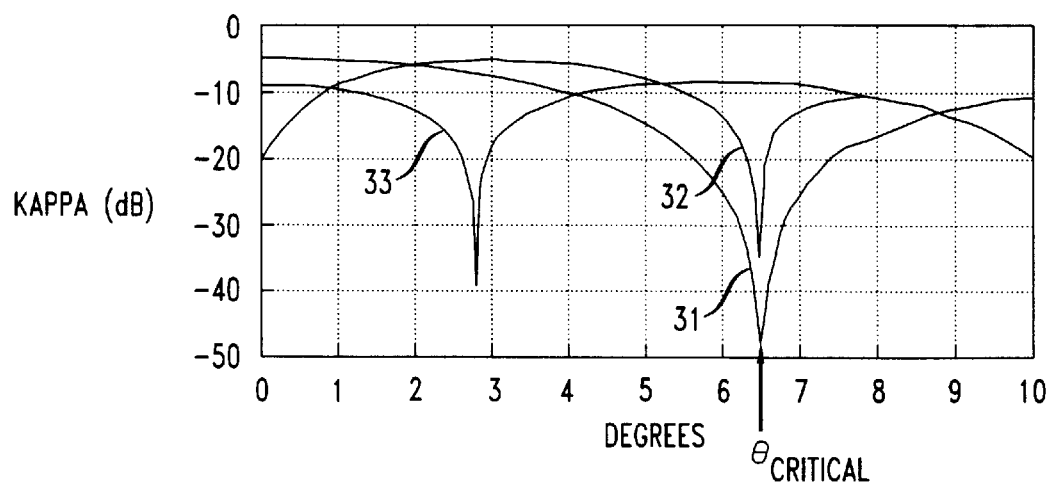
FIG. 3 shows various coupling constants as a function of tilt angle.

FIG. 3 shows the computed values of various coupling strengths as a function of tilt angle, for the fiber of FIGS. 2a–c. As can readily be seen from FIG. 3, at $\theta$~6.5° the $LP_{01,f}$ to $LP_{01,b}$ coupling strength 31 has a "super null", and the $LP_{01,f}$ to $LP_{11,b}$ coupling strength 32 has a regular null which overlaps the $LP_{01}$ to $LP_{01}$ supernull. At the same tilt angle, the $LP_{01,f}$ to $LP_{02,b}$ coupling strength 33 has very nearly a maximum, thereby facilitating efficient mode conversion.

It will be appreciated that practice of the instant invention is not limited to the photosensitivity profile specifically disclosed and is also not limited to $LP_{01,f}$ to $LP_{02,b}$ mode converters. Few-moded optical fibers are known and do not require further discussion.

Independent manipulation of the refractive index profile and photosensitivity profile of a few-moded optical waveguide is not limited to the above-described particular embodiment but can be applied in a more general design procedure to simultaneously null several higher order mode couplings.

Figure 4A:
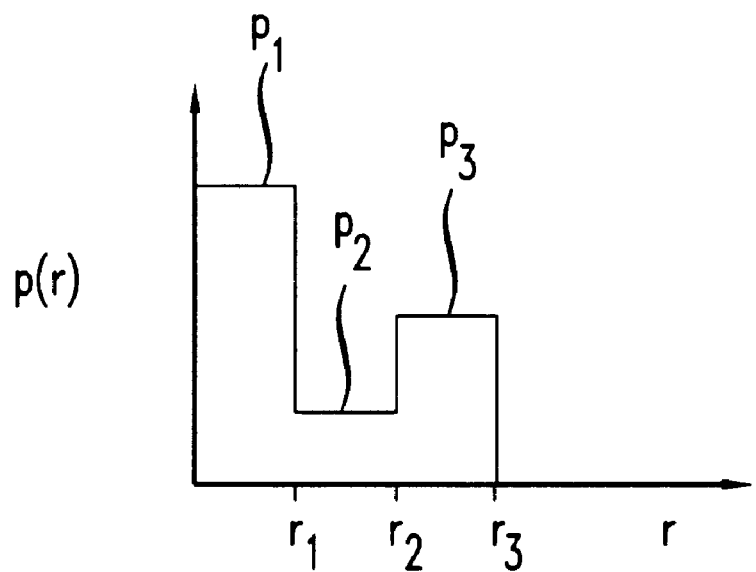
FIGS. 4a–4b schematically depict an exemplary photosensitivity profile and refractive index profile, respectively.

As an example of this general technique, the photosensitivity may be set at different levels p(r) in different annular regions 0 to $r_1$, $r_1$ to $r_2$, etc., as exemplified by FIG. 4a. The refractive index n(r) may likewise be set at different values in a separate set of annular regions 0 to $r_4$, $r_4$–$r_5$, etc. The desired set of mode overlap integrals may then be calculated through a known mathematical optimization procedure. The procedure involves minimizing the unwanted couplings (and maximizing the desired coupling strengths) as a function of the several variables that define the fiber, namely the radii defining the photosensitivity and refractive index profiles, the photosensitivity levels, the refractive index levels, and the tilt angle.

Figure 4B:
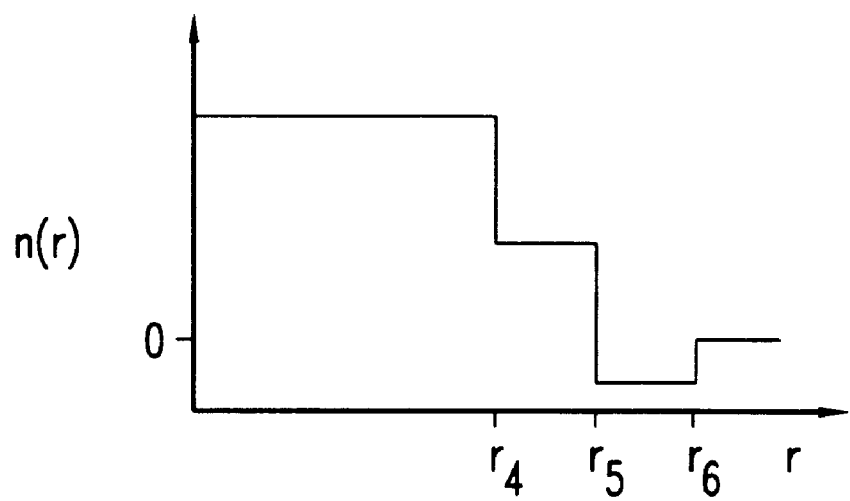

FIGS. 4a and 4b schematically depict an exemplary photosensitivity and refractive index profile of a few-mode fiber. The variables are $p_1$, $p_2$ and $p_3$; $r_1$, $r_2 \ldots r_6$; $n_1$, $n_2$ and $n_3$; and tilt angle $\theta$. The optimization procedure involves evaluation of overlap integrals, substantially as shown above. The optimization procedure is directed towards minimization (nulling) of predetermined coupling strengths (e.g., $\kappa_{01\text{-}01}$, $\kappa_{01\text{-}11}$, $\kappa_{01\text{-}02}$, $\kappa_{11\text{-}11}$ and $\kappa_{02\text{-}02}$), and maximizing another predetermined coupling strength, e.g., $\kappa_{01\text{-}02}$. As another example, in a three moded fiber, $LP_{01}$ is nulled with $LP_{02}$ and $LP_{11}$. By way of further example, in a few-moded fiber (more than 3 guided modes) $LP_{01}$ is nulled with all guided modes except one, or $LP_{01}$ is nulled with all guided modes.

Figure 5:
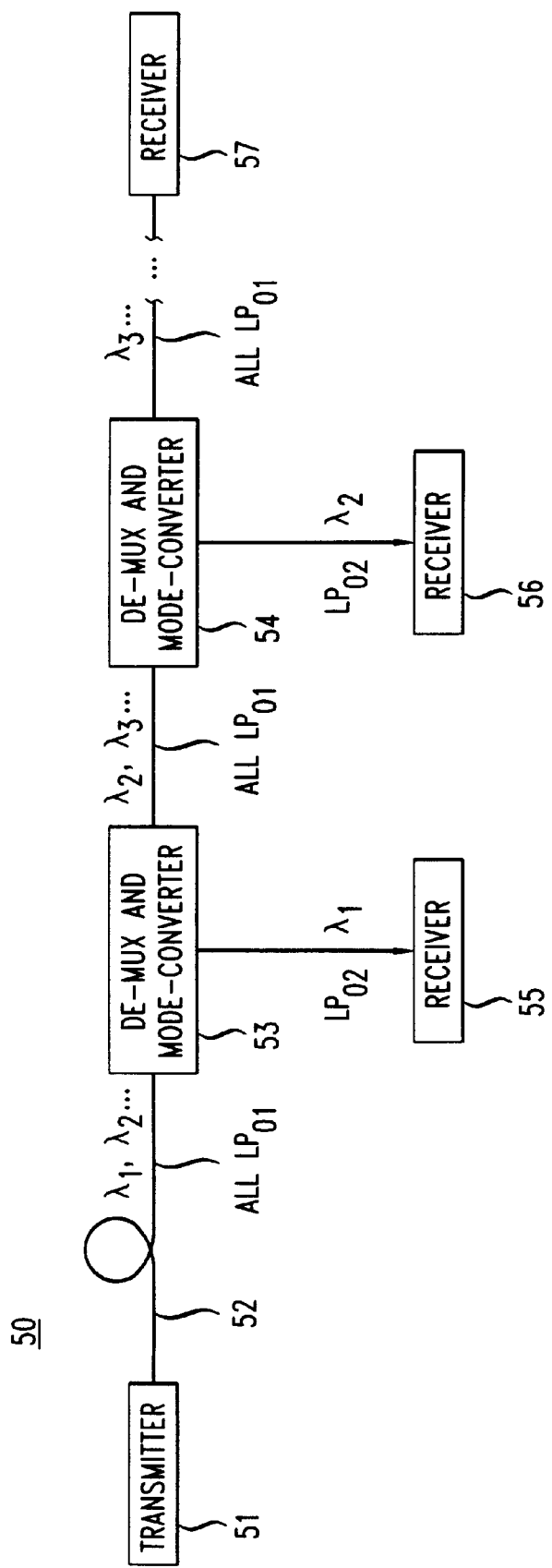
FIG. 5 schematically shows an optical fiber communication system comprising a mode converter according to the invention.

Mode converters as described above can find a variety of uses in an optical fiber communication system. FIG. 5 schematically depicts an exemplary fiber optic communication system 50 wherein numeral 51 refers to a WDM transmitter, 52 refers to optical transmission fiber, 53 and 54 refer to demultiplexers, and 55 to 57 light of wavelengths $\lambda_1$, $\lambda_2 \ldots$, refer to receivers. Fiber 52 guides only the fundamental mode $LP_{01}$, to the first de-multiplexer 53, which comprises a mode converter according to the invention. A channel (e.g., $\lambda_1$) is converted into $LP_{02}$, dropped from the signal stream and received by receiver 55. De-multiplexer 54 similarly drops channel $\lambda_2$ which is detected by receiver 56. Other channels are dropped in similar manner, until only one channel (e.g., $\lambda_n$) remains and is detected by receiver 57.

We claim:

1. An article comprising an optical waveguide mode converter for converting light of wavelength $\lambda$ in a few-moded waveguide from a given guided mode to another guided mode, the mode converter comprising a tilted refractive index grating in the waveguide, the grating having a tilt angle $\theta$, the few-moded waveguide having a core and a cladding surrounding the core, with the mode converter being associated a multiplicity of coupling strengths, wherein a) the few-moded waveguide has a dopant distribution selected to provide the waveguide with a refractive index profile $n(r)$ and a photosensitivity profile $p(r)$, wherein $n(r)$ and $p(r)$ are functions of the radial coordinate of the waveguide;

b) $p(r)$ has at least two different levels of photosensitivity in the core; and c) $n(r)$, $p(r)$ and $\theta$ are selected such that more than one of said coupling strengths are simultaneously nulled, and such that at least one of said coupling strengths is substantially maximized.

2. Article according to claim 1, wherein the few-moded waveguide is a 3-moded waveguide, wherein said given guided mode is the fundamental mode $LP_{01}$, and wherein $n(r), p(r)$ and $\theta$ are selected such that a $LP_{01}$ to $LP_{11}$ coupling strength and a $LP_{01}$ to $LP_{02}$ coupling strength are substantially nulled, and such that a $LP_{01}$ to $LP_{01}$ coupling strength is substantially maximized.

3. Article according to claim 1, wherein said given guided mode is the fundamental mode $LP_{01}$, and wherein $n(r), p(r)$ and $\theta$ are selected such that the $LP_{01}$ coupling strength with all guided modes in the waveguide except one is nulled.

4. Article according to claim 1, wherein said given guided mode is the fundamental mode $LP_{01}$, and wherein $n(r), p(r)$ and $\theta$ are selected such that the $LP_{01}$ coupling strength with all guided modes in the waveguides is nulled, and one coupling strength between any two higher order modes is substantially maximized.

5. Article according to claim 1, wherein the few-moded waveguide is three-moded optical fiber, the given guided mode is the fundamental mode $LP_{01}$ propagating in a forward direction, and $n(r)$, $p(r)$ and $\theta$ are selected such that the $LP_{01}$ to $LP_{01}$ coupling strength is substantially nulled, the $LP_{01}$ to $LP_{11}$ coupling strength is substantially nulled, and the $LP_{01}$ to $LP_{02,b}$ coupling strength is substantially maximized.

6. Article according to claim 1, wherein the article is a WDM optical fiber communication system that comprises a transmitter, two or more receivers, and optical fiber transmission paths that signal-transmissively connect the transmitter and the receivers, wherein at least one of said transmission paths comprises a demultiplexer that comprises said tilted refractive index grating.

7. Article according to claim 6, wherein at least a portion of said transmission path is single mode fiber, said single mode fiber being signal transmissively connected to said few-moded waveguide.

8. Article according to claim 1, wherein the few-moded waveguide is a three-moded optical fiber supporting $LP_{01}$, $LP_{11}$ and $LP_{02}$ modes, and $n(r)$, $p(r)$, and $\theta$ are selected to maximize the $LP_{02}$–$LP_{11}$ coupling strength and minimize all other coupling strengths.

9. Article according to claim 1, wherein all coupling strengths for a given mode are nulled, and wherein one coupling strength that does not involve said given mode is maximized.

10. Article according to claim 1, wherein all coupling strengths except one are nulled.

11. Article according to claim 1, wherein said tilted refractive index grating is formed by exposure to UV radiation of a first wavelength, and is modified by exposure to UV radiation of a second wavelength, such that a nulling condition of the tilted refractive index grating is adjusted.

* * * * *